(12) United States Patent
Goldie (10) Patent No.: US 6,244,144 B1
(45) Date of Patent: Jun. 12, 2001

(54) HORIZONTAL BAND SAW DEVICE HAVING MULTIPLE LANES OF TRAVEL AND ASSOCIATED METHOD

(76) Inventor: Douglas William Goldie, R.R. 1, Box 90A, Canton, MO (US) 63435

( * ) Notice: Subject to any disclaimer, the term of this patent is extended or adjusted under 35 U.S.C. 154(b) by 0 days.

(21) Appl. No.: 09/086,056

(22) Filed: May 28, 1998

(51) Int. Cl.[7] .................................................. B26D 1/00
(52) U.S. Cl. .................................................. 83/13; 83/789
(58) Field of Search .............................. 83/789, 813, 429, 83/435.15, 435.2, 422, 871

(56) References Cited

U.S. PATENT DOCUMENTS

| | | |
|---|---|---|
| 1,449,015 | 3/1923 | Schenkel . |
| 2,726,719 | 12/1955 | Marcalus . |
| 2,822,003 | 2/1958 | McCahon et al. . |
| 3,318,347 | 5/1967 | Alich . |
| 3,459,246 | 8/1969 | Ottosson . |
| 3,545,504 | 12/1970 | Ferrari . |
| 3,621,895 | 11/1971 | Leidig . |
| 3,736,820 * | 6/1973 | Jung ............................................. 83/4 |
| 3,789,717 * | 2/1974 | Stolzer .................................... 83/796 |
| 3,826,164 | 7/1974 | Campbell . |
| 4,211,131 * | 7/1980 | Fenn ......................................... 83/86 |
| 4,416,312 | 11/1983 | Ostberg . |
| 4,848,532 | 7/1989 | Lauffer . |
| 4,893,533 * | 1/1990 | Harris ....................................... 83/13 |
| 5,035,166 * | 7/1991 | Carlson ................................... 83/801 |
| 5,088,363 | 2/1992 | Jones et al. . |
| 5,305,673 | 4/1994 | Costley . |
| 5,320,017 * | 6/1994 | Lecrone .................................. 83/871 |
| 5,418,729 * | 5/1995 | Holmes ................................. 364/474 |

OTHER PUBLICATIONS

Baker Products Brochure/Product Information.

\* cited by examiner

*Primary Examiner*—Lee Young
*Assistant Examiner*—Sean Smith
(74) *Attorney, Agent, or Firm*—Haverstock, Garrett & Roberts LLP (57) ABSTRACT

A horizontal band saw device for cutting lengthwise along boards passed therethrough enables increased cutting capacity of such boards and includes a head with both a first board conveyor passing therethrough and a second board conveyor passing therethrough. The head includes an inlet end, an outlet end, a board receiving passage, and a movable band saw blade, the board receiving passage having the movable band saw blade passing from a first side to a second side thereof. The first board conveyor extends through the board receiving passage of the head and beneath the band saw blade. The second board conveyor extends through the board receiving passage of the head and beneath the band saw blade, the second board conveyor being spaced from the first board conveyor. The first board conveyor is operable to continuously feed a first board resting thereon through the board receiving passage at a set speed and the second board conveyor is operable to continuously feed a second board resting thereon through the board receiving passage at the set speed such that the first board and the second board are simultaneously cut along their respective lengths by the band saw blade thereby at least doubling the board cutting capacity of the horizontal band saw device as compared to a band saw device including only one board conveyor operating at the set speed. Each board conveyor defines a lane of travel of the band saw device and more than two lanes of travel may be provided.

9 Claims, 8 Drawing Sheets

HORIZONTAL BAND SAW DEVICE HAVING MULTIPLE LANES OF TRAVEL AND ASSOCIATED METHOD

FIELD OF THE INVENTION

This invention relates generally to horizontal band saws for cutting boards, and more particularly, to a horizontal band saw device which includes multiple lanes of travel for simultaneously cutting multiple boards along their respective lengths with a single band saw blade thereby enabling increased cutting capacity of such boards.

BACKGROUND OF THE INVENTION

Horizontal band saws of a variety of configurations have been used in the past. Such horizontal band saws typically include a number of common features such as a head having a pair of rotatable wheels around which a band saw blade extends. At least one of the wheels is controllably rotatable through the use of a motor. Rotation of the wheels causes the band saw blade to move across a board receiving passage of the head. A board conveyor, such as a belt, passes through the board receiving passage and below the band saw blade. A board resting on the board conveyor is fed through the head so as to be cut along its length. The height of the board conveyor relative to the band saw blade can typically be adjusted to control how the board is cut.

In many applications, such as in resaw applications involving short boards, it is desired to maximize board cutting capacity. One technique used in the past for increasing board cutting capacity has been to align multiple band saw heads in back to back fashion such that a large board may be cut lengthwise into a plurality of smaller boards. As a board is passed through such a device it is cut along its length a number of times by different band saw blades resulting in a plurality of stacked board pieces which exit the device. Such sequential band saw devices have effectively increased the cutting capacity achievable by a single machine operator. However, such band saw devices have accompanying disadvantages including relatively high cost due to the large number of band saw heads needed. Further, it has been found that as the number of band saw heads is successively increased a point is reached where board cutting capacity begins to diminish due to the increased likelihood of machine down time. In particular, when one head in a system breaks down the entire band saw line must typically be shut down while the one head is repaired. Still further, the size of such band saw devices becomes a problem as a large number of band saw heads are aligned back to back. For example, in order to cut a six inch high board into eight ¾ inch high boards in a single pass it is necessary to align seven band saw heads back to back.

Accordingly, it is an object of the present invention to provide a horizontal band saw device and method for cutting multiple boards along their respective lengths simultaneously.

Another object of the present invention is to provide a band saw device having a band saw head with multiple board conveyors passing therethrough to provide increased board cutting capacity as compared to existing band saw devices which have band saw heads including only one board conveyor passing therethrough.

Yet another object of the present invention is to provide a band saw device and associated method in which multiple band saw heads are placed back to back, each successive band saw head including a greater number of lanes of travel than the previous band saw head.

SUMMARY OF THE INVENTION

These and other objects of the invention are attained by an apparatus which, in one embodiment, is a horizontal band saw device for cutting lengthwise along boards passed therethrough and enabling increased cutting capacity of such boards. The band saw device includes a head and, importantly, both a first board conveyor passing therethrough and a second board conveyor passing therethrough. The head includes an inlet end, an outlet end, a board receiving passage, and a movable band saw blade, the board receiving passage having the movable band saw blade passing from a first side to a second side thereof. The first board conveyor extends through the board receiving passage of the head and beneath the band saw blade. The second board conveyor extends through the board receiving passage of the head and beneath the band saw blade, the second board conveyor being spaced from the first board conveyor. The first board conveyor is operable to continuously feed a first board resting thereon through the board receiving passage at a set speed and the second board conveyor is operable to continuously feed a second board resting thereon through the board receiving passage at the set speed such that the first board and the second board are simultaneously cut along their respective lengths by the band saw blade thereby at least doubling the board cutting capacity of the horizontal band saw device as compared to a band saw device including only one board conveyor operating at the set speed. Each board conveyor defines a lane of travel of the band saw device. In a preferred embodiment of the invention dust collecting apparatus is provided between adjacent lanes of travel of the band saw device and may include, for example, a dust directing bin and a vacuum source.

In another aspect of the present invention a method for cutting a board along its length into at least four board pieces is provided. The method involves providing a first band saw head including at least a first lane of travel therethrough and a band saw blade continuously moving across the first lane of travel. The board is passed through the first band saw head along the first lane of travel such that the board is cut along its length into a first board piece and a second board piece. A second band saw head is provided and includes at least a first lane of travel and a second lane of travel therethrough, and a band saw blade traveling across both the first and second lanes of travel. The first board piece exiting the first band saw head is directed to the first lane of travel of the second band saw head and the second board piece exiting the first band saw head is directed to the second lane of travel of the second band saw head. The first board piece is passed through the second band saw head along the first lane of travel thereof such that the first board is cut along its length into two pieces, and the second board piece is passed through the second band saw head along the second lane of travel thereof such that the second board piece is cut along its length into two pieces.

BRIEF DESCRIPTION OF THE DRAWINGS

For a better understanding of the present invention reference may be made to the accompanying drawings in which.

DETAILED DESCRIPTION OF THE DRAWINGS

Figure 1:
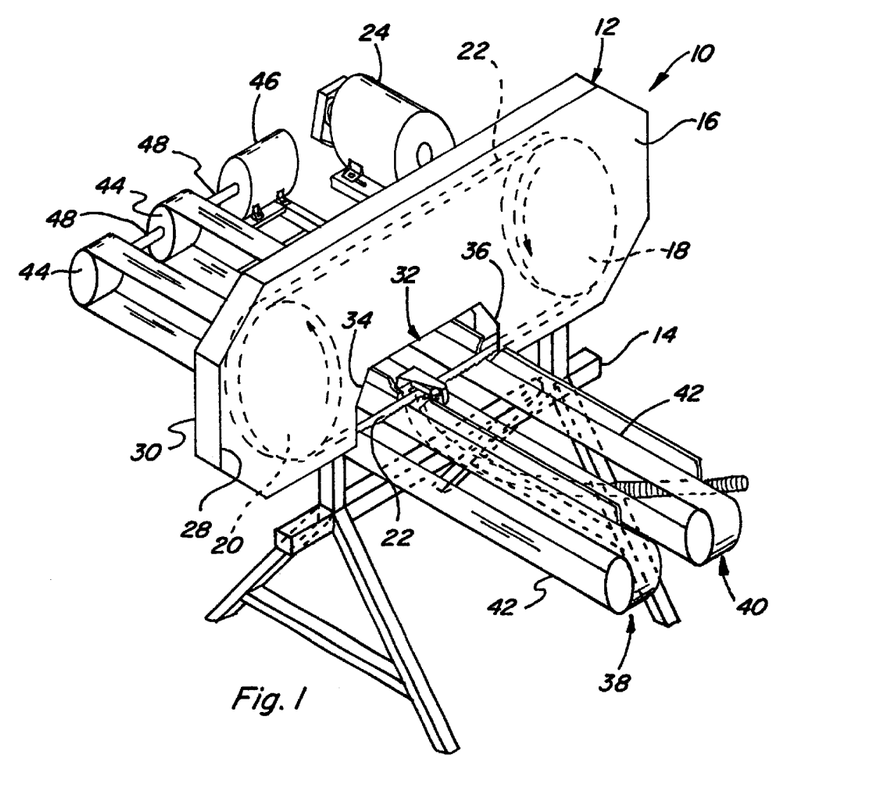
FIG. 1 is a perspective view of a band saw device including a head having two board conveyors passing therethrough in accordance with the present invention.
Figure 2:
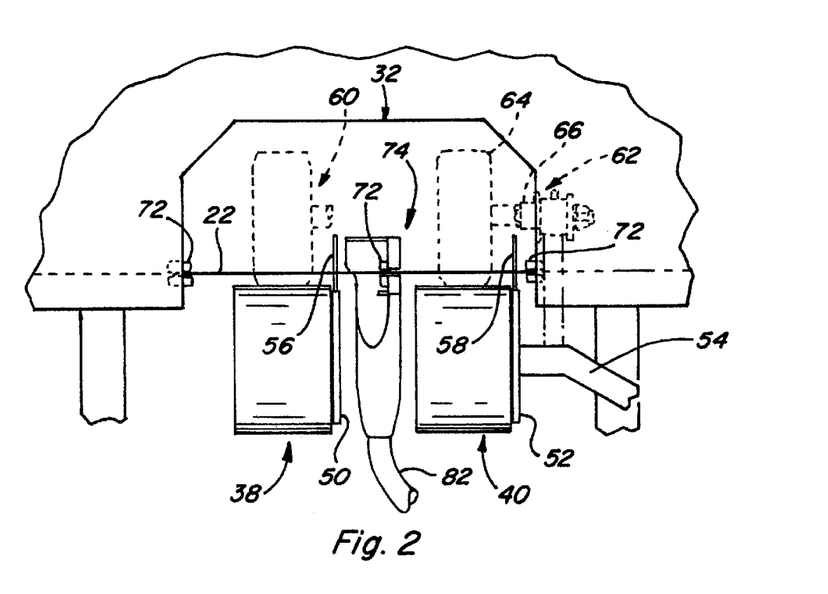
FIG. 2 is a partial front end view of the band saw device of FIG. 1 including hold down wheels and dust collecting apparatus.
Figure 3:
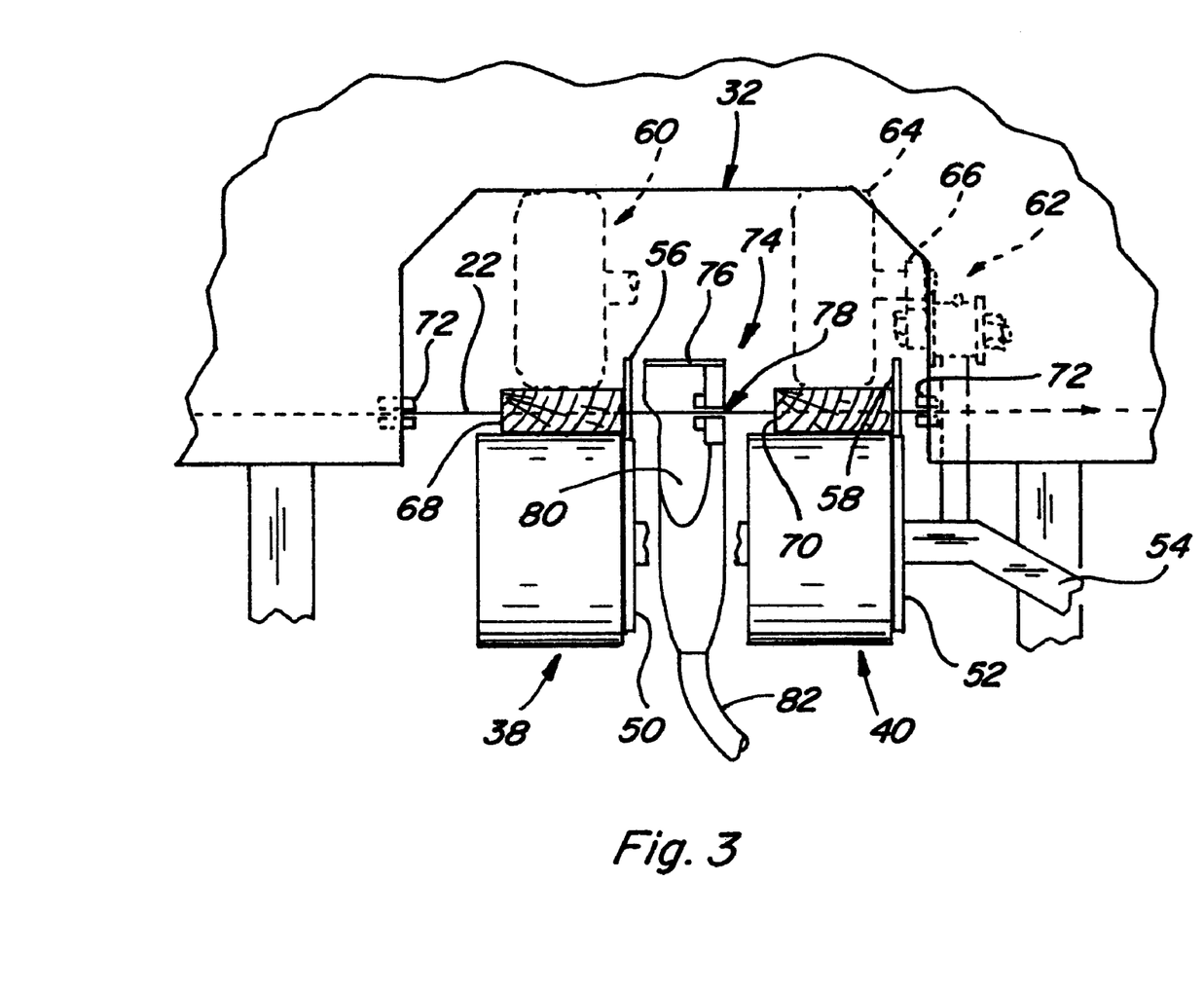
FIG. 3 is a partial front end view of the band saw device of FIG. 1 having a first board and a second board passing therethrough, each on a respective board conveyor, so as to be simultaneously cut by the band saw blade.

Referring to FIGS. 1–3, an increased cutting capacity band saw device 10 is shown. Band saw device 10 includes a head 12 mounted on a metal support frame 14 of suitable construction. It is recognized that support frame 14 may take a variety of configurations. Head 12 includes a housing 16 within which are located a pair of rotatable wheels 18 and 20. A band saw blade 22 extends around wheels 18 and 20 for rotation therewith, at least one of wheels 18 and 20 being controllably rotatable by a motor 24 associated therewith, such as through a belt and drive shaft arrangement. Head 12 includes an inlet end 28 and an outlet end 30 with a board receiving passage 32 extending therethrough, band saw blade 22 passing from a first side 34 to a second side 36 of board receiving passage 32.

A first board conveyor 38 extends through board receiving passage 32 and, importantly, a second board conveyor 40, which is offset from first board conveyor 38, also extends through board receiving passage 32. In the illustrated embodiment each board conveyor is formed by a respective continuous loop belt 42 which extends around belt rollers 44. Associated with exit end belt drive rollers 44 is a motor 46 for controlling rotation of each belt via shaft members 48. Motor 46 is preferably a controllable speed motor such that the feed in speed provided by each board conveyor 38 and 40 is adjustable as desired. It is recognized that in some cases each belt 42 could be controlled by its own motor if desired. It is also recognized that each board conveyor 38 and 40 could be formed from other suitable means. For example, each board conveyor 38 and 40 could be formed by a respective moving track. Further, each board conveyor 38 and 40 could be formed by a respective series of aligned and rotating roller members on which boards fed through head 12 rest. Regardless of the exact construction of each board conveyor 38 and 40, an important aspect of the present invention is that each board conveyor 38 and 40 defines a respective lane of travel through band saw head 12 such that at least two lanes of travel through head 12 are provided. With multiples lanes of travel the board cutting capacity of head 12 is thus increased because multiple boards can be cut along their respective lengths simultaneously with the same band saw blade 22.

As best seen in the partial front end view of FIG. 2, each board conveyor 38 and 40 includes a respective support rail 50 and 52 positioned to at least one side thereof which support rails 50 and 52 may be connected to support frame 14, to a side support member such as member 54, or both. The belt rollers may be mounted for rotation to support rails 50 and 52 such as by a suitable shaft and bearing assembly. Associated with each board conveyor 38 and 40 is a respective board guide rail 56 and 58 which guide rails may be connected to or formed integral with respective support rails 50 and 52. Also associated with the inlet end of each board conveyor is a respective hold down wheel assembly 60 and 62 (shown in shadow). Such assemblies are known in the art and typically include a wheel 64 rotatably connected to a pivot arm 66 which is biased by a spring at its free end toward the upper surface of the board conveyor. As best shown in FIG. 3 such hold down wheel assemblies 60 and 62 are positioned and oriented to maintain boards 68 and 70 passing through head 12 in stable and aligned position to assure appropriate cutting along their respective lengths. Hold down wheel assemblies may also be provided at the outlet end of head 12 as necessary. The downward biasing action of the hold down wheels could alternatively be provided by other means or apparatus, such as hydraulic means, rather than springs. It is also recognized that other types of board stabilizing means or apparatus could be used in place of hold down wheel assemblies 60 and 62. For example, where space allows hold over wheels or arms could be provided as is known in the art.

Also shown in FIGS. 2 and 3 are blade guides 72 which may be of known construction to maintain horizontal blade alignment so as to assure a consistent horizontal cut through boards 68 and 70. Further, it is preferred that dust collection means or apparatus 74 be provided between board conveyors 38 and 40 in order to collect dust which is created as band saw blade 22 passes through board 68 toward board 70. Collection of such dust is desirable for a variety of reasons including to maintain a clean workplace as well as to assure that blade 22 is relative free from surface debris as it enters board 70. In this regard, a dust collecting shield or bin 76 is provided having a slot 78 formed therein to allow blade 22 to pass therethrough. Bin 78 is preferably of curved configuration with an open side which faces board 68 so that flying sawdust is stopped and directed downward toward an opening 80 which may be connected by hose 82 to a vacuum source such as a motor (not shown). Sawdust may thus be carried to a remote area for collection. It is also recognized that other types of dust collection means or apparatus may be provided. For example, brush members which actually contact blade 22 to remove debris therefrom could be provided or a device which directs a high speed stream of air across the blade path could be provided. It is also recognized and anticipated that in order to provide versatility band saw device 10 may include head or blade height adjustment means or board conveyor height adjustment means, as is known in the art, in order to facilitate various cutting heights.

Importantly, band saw device 10 provides increased board cutting capacity by enabling two boards 68 and 70 to be cut simultaneously by the same blade 22. The board cutting capacity of such device 10 could be further increased by providing additional board conveyors or lanes of travel. In such a device it is anticipated that a suitable blade guide 72 might be positioned between each adjacent lane of travel and it is preferred that suitable dust collection means or apparatus be provided between each lane of travel. It is recognized that it may be necessary to increase the distance between wheels 18 and 20 to accommodate additional lanes of travel.

Figure 4:
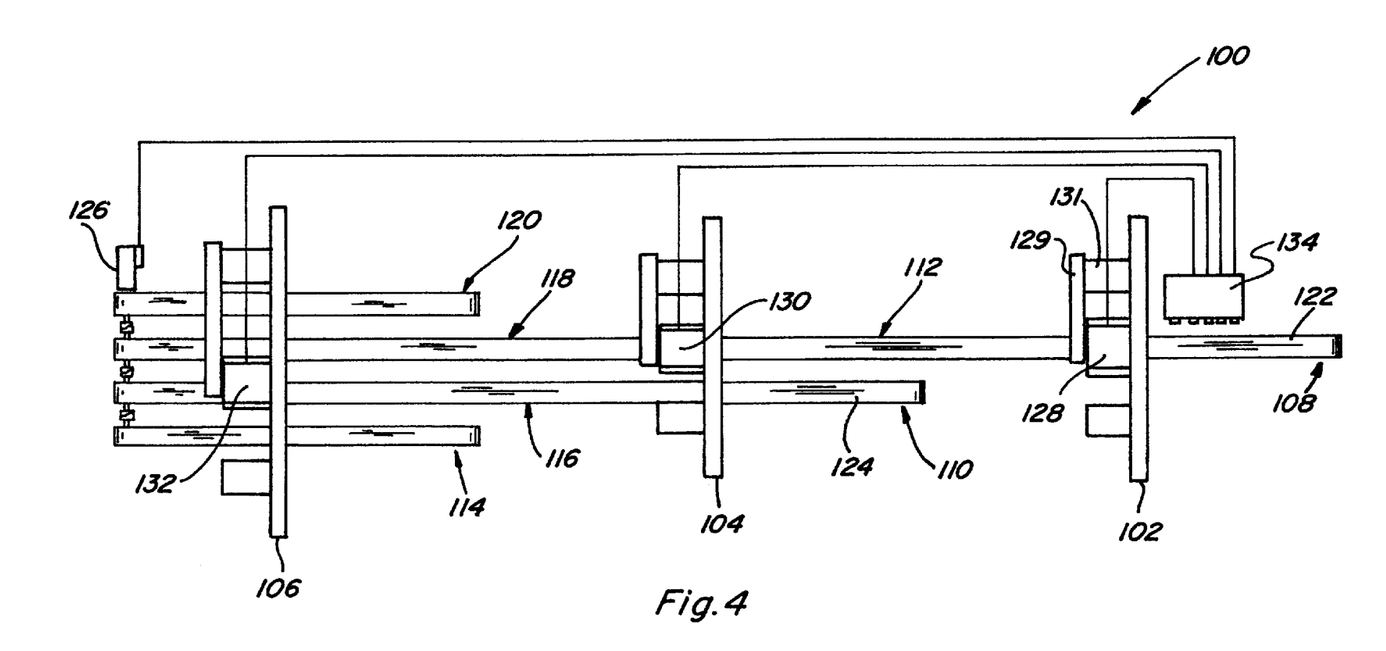
FIG. 4 is a schematic top view of a band saw device including multiple band saw heads placed back to back, with each band saw head including a greater number of lanes of travel than the previous head.

In order to further capitalize on the simultaneous board cutting capacity provided by multi-lane of travel band saws of the present invention, multiple head band saw devices may be constructed. In this regard, referring to FIG. 4 a schematic top view of a band saw device 100 is shown including a first band saw head 102, a second band saw head 104, and a third band saw head 106, each head being fairly represented by the head shown and described with reference to FIG. 1. Each head may be mounted to a single, suitable frame which extends from end to end of device 100 Alternatively, separate frames could be provided for each head. As shown, each successive band saw head includes an increasing number of lanes of travel therethrough. In particular, first band saw head 102 includes a single board conveyor 108, second band saw head 104 includes first 110 and second 112 board conveyors, and third band saw head 106 includes first 114, second 116, third 118, and fourth 120 board conveyors. The board conveyors can be formed in a variety of ways as previously described including by belts, tracks, or aligned rollers. For example, board conveyors 108, 112, and 118 may be formed by a single continuous belt 122. In the alternative each board conveyor 108, 112, and 118 could be formed from separate but aligned belts having drive means linked through a system of chains and sprockets for example. Similarly, board conveyors 110 and 116 could be formed by a single continuous belt 124 or by two aligned belts. A single motor 126 for controlling movement of all board conveyors is provided, although multiple motors could be utilized. Each band saw head includes a respective motor 128, 130, and 132 to control the band saw blade thereof, a belt or chain housing 129 and wheel drive shaft housing 131 being shown for each. A control station 134 connected for controlling each of motors 126, 128, 130, and 132 is also provided. Although not shown, it is anticipated that each head of device 100 will include associated board stabilizing means or apparatus such as hold down wheel assemblies.

Figure 5:
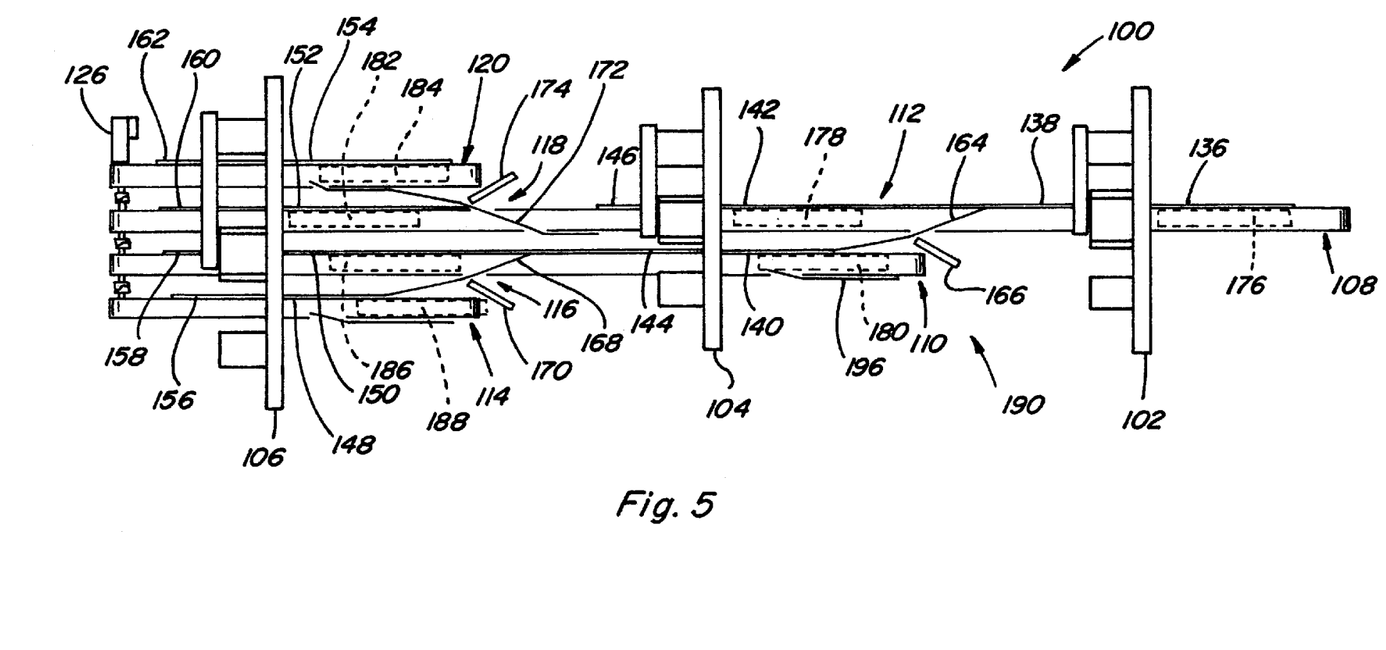
FIG. 5 is a schematic top view of the band saw device of FIG. 4 including associated rails and depicting representative board positions thereon.

The additional benefits provided by band saw device 100 are best seen with reference to FIG. 5 which depicts another schematic top view of band saw device 100 including guide rails and representative boards (shown in shadow). In particular, entrance end guide rail 136 and exit end guide rail 138 are shown for head 102; entrance end guide rails 140 and 142 and exit end guide rails 144 and 146 are shown for head 104; and entrance end guide rails 148, 150, 152, and 154 and exit end guide rails 156, 158, 160, and 162 are shown for head 104. Also shown between head 102 and 104 is a transfer rail 164 which is angled from a first lane of travel defined by board conveyors 108 and 112 to a second lane of travel defined by board conveyor 110, a board support roller 166 being positioned along the angled line of transfer. Similarly, a transfer rail 168 and support roller 170 are provided between head 104 and head 106 from a line of travel defined by board conveyor 116 to a lane of travel define by board conveyor 114, and a transfer rail 172 and support roller 174 are provided from a lane of travel defined by board conveyor 118 to a lane of travel defined by board conveyor 120.

In general, operation of the band saw device 100 is as follows. A board 176 is passed through the band saw head 102 along board conveyor 108 such that the board is cut along its length into a first board piece 178 and a second board piece 180. As shown, first board piece 178 exiting head 102 is directed to board conveyor 112 and second board piece 180 exiting head 102 is directed to board conveyor 110. First board piece 178 is passed through head 104 along board conveyor 112 such that first board piece 178 is cut along its length into two pieces 182 and 184, and second board piece 180 is passed through head 104 along board conveyor 110 such that second board piece 180 is cut along its length into two pieces 186 and 188. Piece 182 is directed to board conveyor 118, piece 184 is directed to board conveyor 120, piece 186 is directed to board conveyor 116, and piece 188 is directed to board conveyor 114 as shown. Each piece 182, 184, 186, and 188 is then fed through head 106 to be cut along its length, the end result being that board 176 is cut into eight pieces. By way of example only, and disregarding material loss, if board 176 is a six inch high board, head 102 may be configured to result in two three inch high boards 178 and 180; head 104 may be configured to result in four 1.5 inch high boards 182, 184, 186, and 188; and head 106 may be configured to result in eight 0.75 inch high boards.

Figure 6:
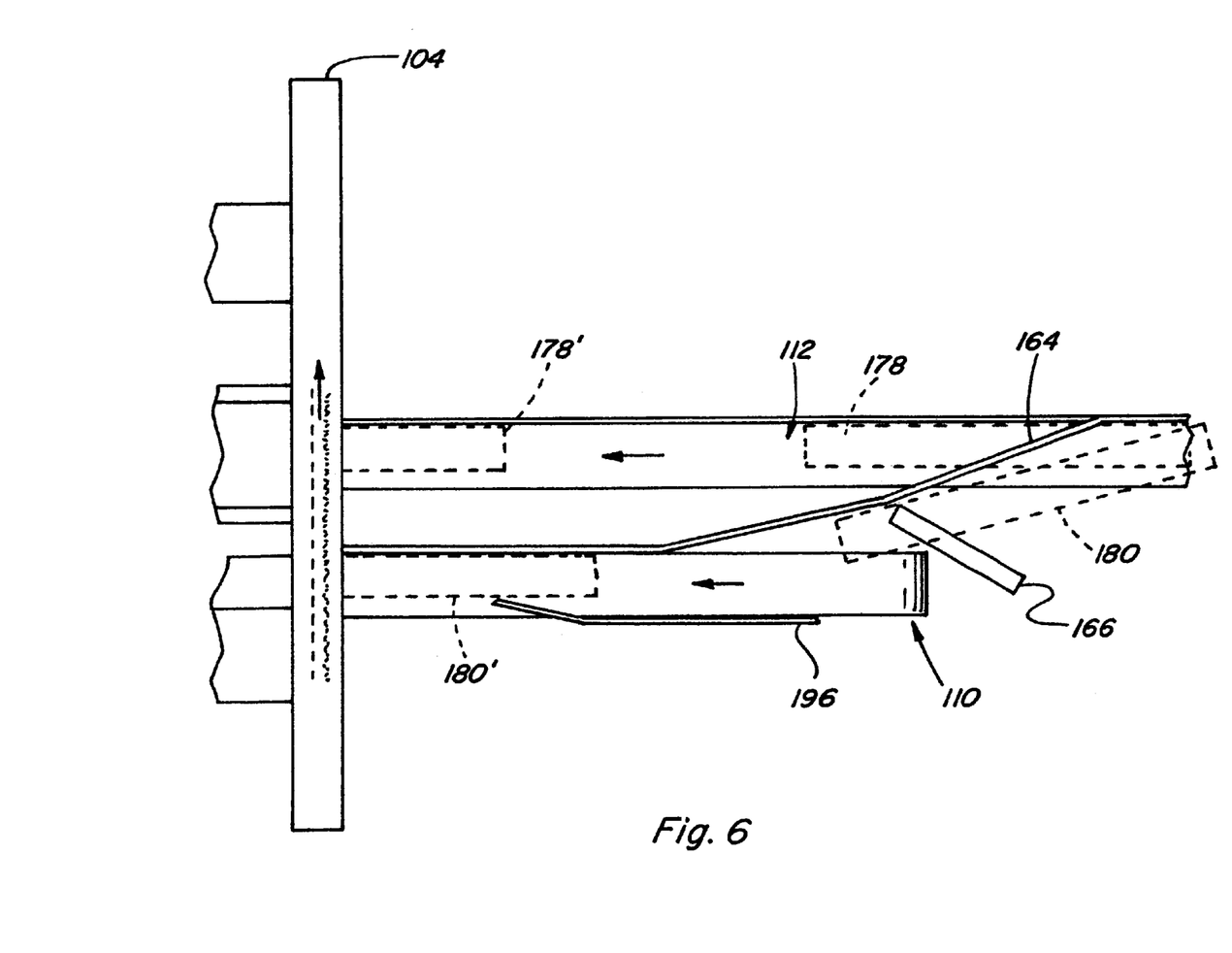
FIG. 6 is an enlarged top view of a board transfer region of the band saw device of FIG. 5.
Figure 7:
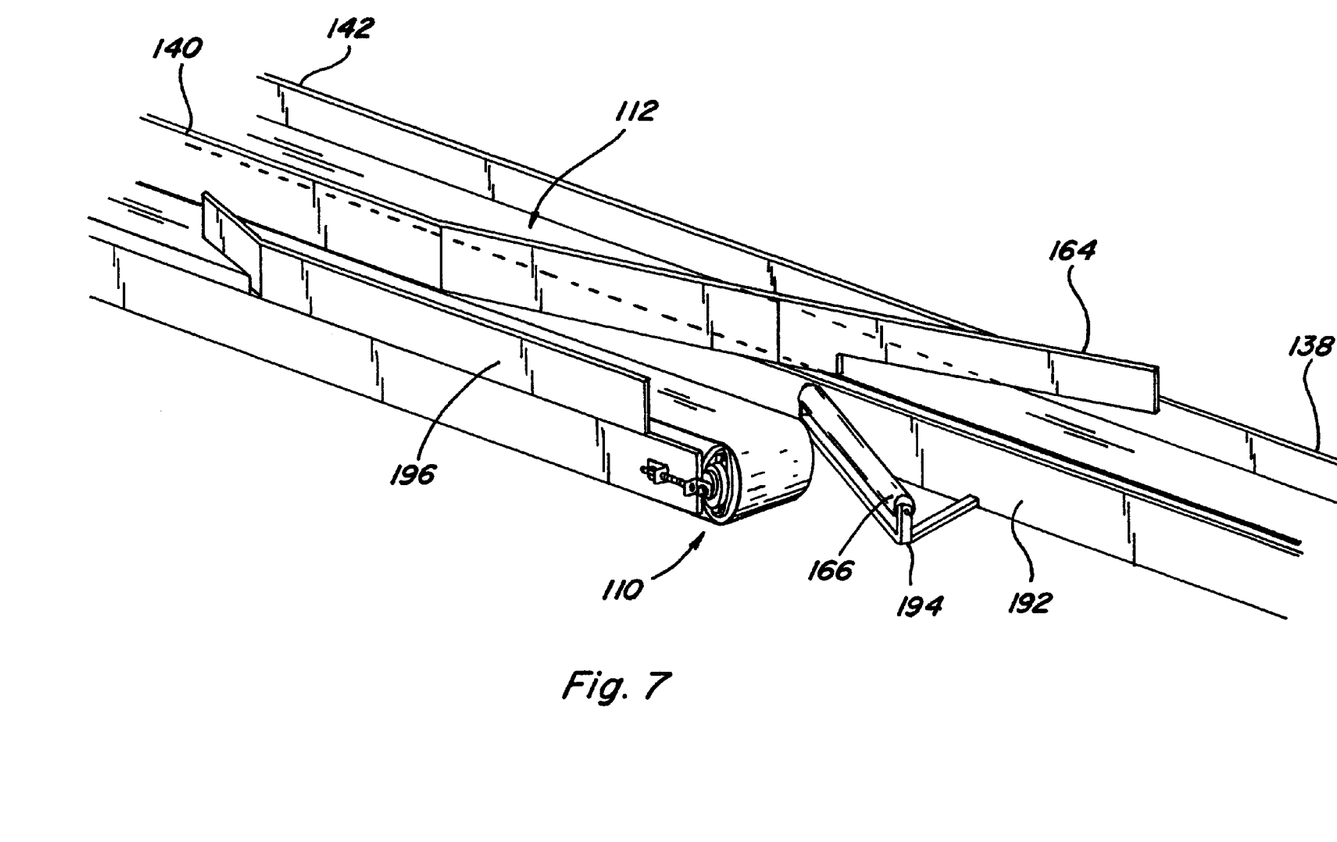
FIG. 7 is a partial perspective view of the board transfer region of FIG. 6.
Figure 8:
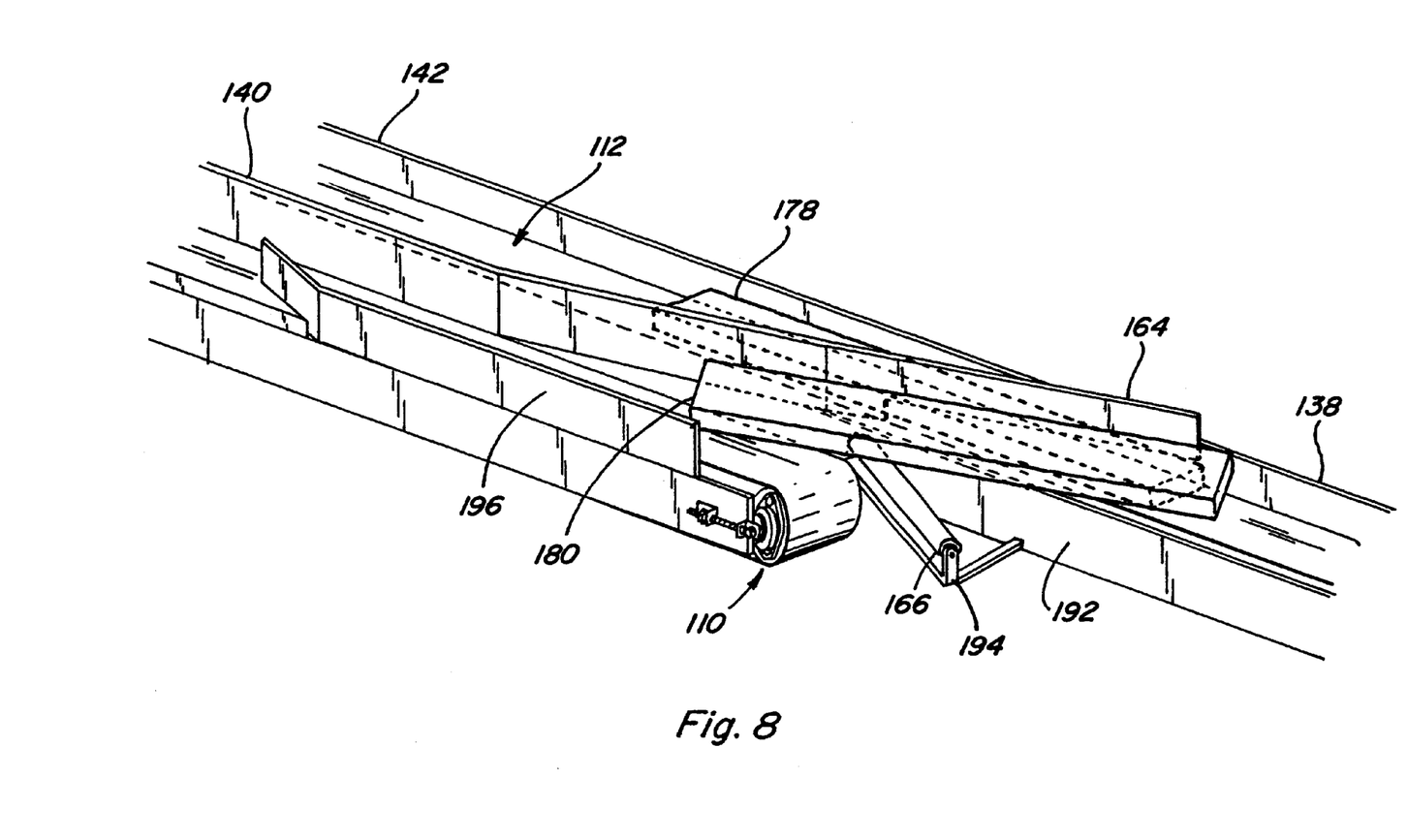
FIG. 8 is a partial perspective view of the board transfer region of FIG. 6 with boards shown.

With regard to directing cut board pieces to their desired lanes of travel or board conveyors, reference is made to FIGS. 6–8, FIG. 6 depicting an enlarged top view of region 190 between head 102 and head 104 of FIG. 5, FIG. 7 showing a partial perspective view of region 190, and FIG. 8 showing a partial perspective view of region 190 including boards. Means or apparatus for providing such board direction is shown including transfer rail 164 and board support roller 166, along with board conveyor 110, board conveyor 112, and head 104. Board support roller 166 is mounted to a side support rail 192, such as by arm 194, such mounting allowing for rotation of support roller 166. As board pieces 178 and 180 exit head 102, board piece 180 rests atop board piece 178. Transfer rail 164 is positioned across the board path and is appropriately spaced from the top surface of the board path such that board piece 178 passes beneath transfer rail 164 and such that board piece 180 contacts transfer rail 164. Such contact directs board piece 180 over support roller 166 and toward board conveyor 110 as shown. A guide rail 196 is provided to further direct board piece 180 back into appropriate alignment with the lane of travel defined by board conveyor 110. Transfer rail 164 and board support roller 166 are typical of that provided between head 104 and head 106 as well. It is also recognized that other suitable means or apparatus could be provided for directing boards from one lane of travel to another. For example, a movable transfer arm mechanism could be provided or even a robotic arm which picks up a board piece and transfers it could be provided.

As best shown in FIG. 6, transfer of a board piece to an adjacent lane of travel may result in such board piece falling slightly behind. For example, the position of respective board pieces 178 and 180 at a later point in time is shown as 178' and 180', board piece 178' having entered the band saw head 104 prior to board piece 180'. It is recognized that although the cutting durations of the two board pieces 178' and 180' are not always synchronous, as used herein the terminology simultaneously cut along their respective lengths encompasses such a cut. In particular, two boards are considered simultaneously cut by the same blade if at least some portion of each board is being cut at the same time by that blade.

Figure 9:
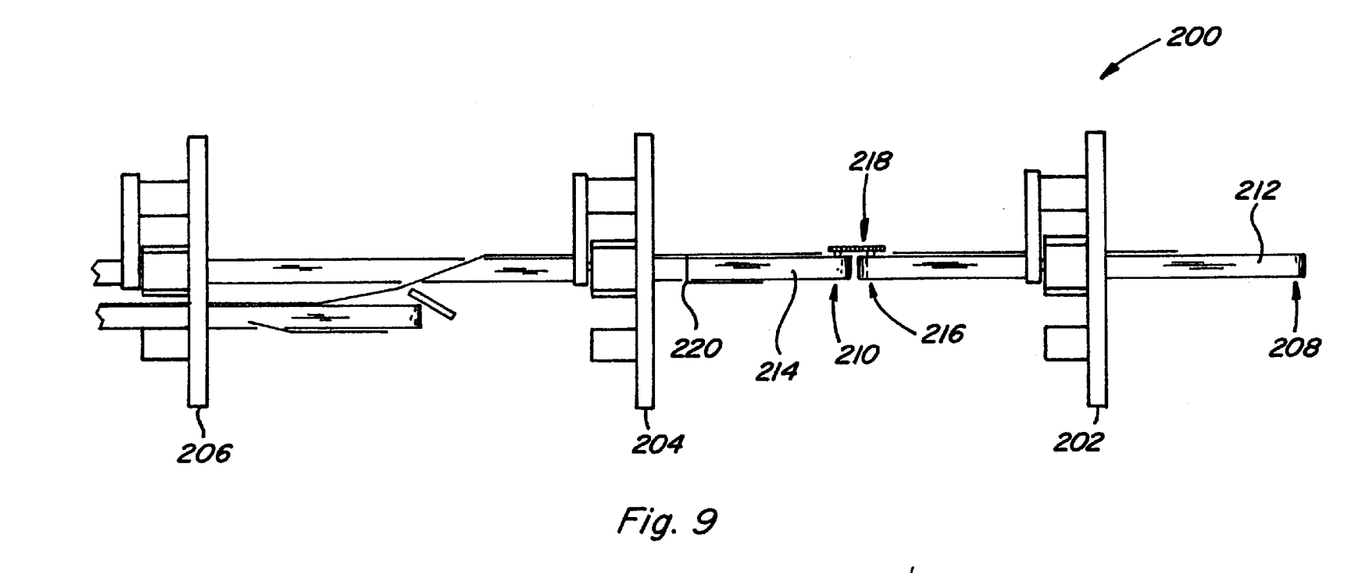
FIG. 9 is a schematic top view of an alternative embodiment of a band saw device including three band saw heads.
Figure 10:
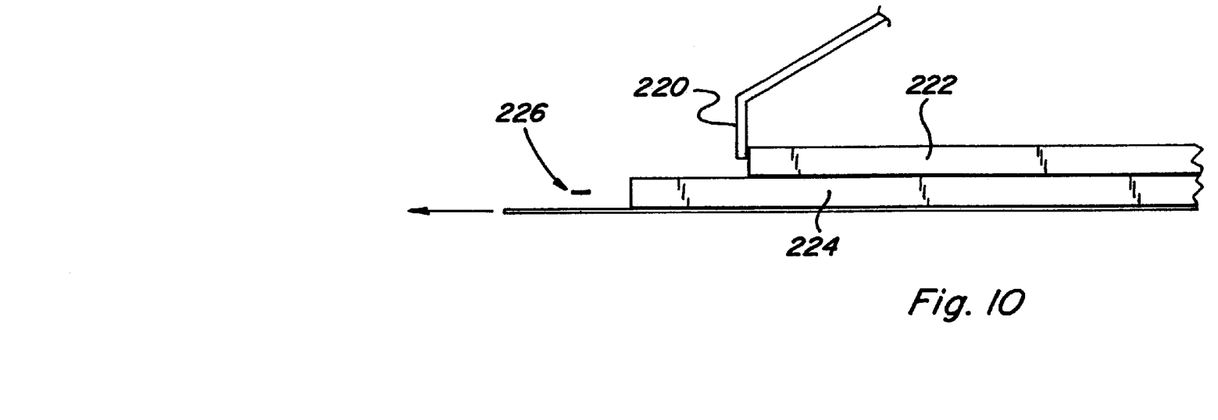
FIG. 10 is an enlarged schematic side view of a board delay region of the band saw device of FIG. 9.

Another embodiment of an increased board cutting capacity band saw device 200 is depicted in FIGS. 9 and 10. In particular, band saw heads 202, 204, and 206 are provided. However, unlike band saw device 100, both head 202 and head 204 of band saw device 200 include only one respective board conveyor 208 and 210 or lane of travel. Board conveyor 208 is formed by a single belt 212 and board conveyor 210 is likewise formed by a separate, single belt. A controlled relative speed between the two is provided, the feed in speed of board conveyor 210 being at least twice that of board conveyor 208. For example, a drive roller 216 of board conveyor 208 may be geared through an appropriate chain and sprocket configuration 218 to conveyor 210 to provide such a relative speed. As best seen in the enlarged partial schematic side view of FIG. 10, a board delay rail 220 is provided across board conveyor 214 such that a top board piece 222 exiting head 202 is held back while a bottom board piece 224 continues through head 204 to be cut by a blade 226, top board piece 222 then falling in place behind bottom board piece 224 to be fed through head 204 and cut by blade 226. Thus, the higher speed of board conveyor 210 is necessary in order to enable it to cut twice the board length as head 202 in the same amount of time. Third head 206 may be configured substantially as second head 104 of FIG. 2.

From the preceding description of the illustrated embodiments, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A horizontal band saw device for cutting lengthwise along boards passed therethrough and enabling increased cutting capacity of such boards, comprising:
   a head including an inlet end, an outlet end, a board receiving passage, and a movable band saw blade, the movable band saw blade passing through the board receiving passage from a first side to a second side thereof;
   a first board conveyor extending through the board receiving passage of the head and beneath the band saw blade;
   a second board conveyor extending through the board receiving passage of the head and beneath the band saw blade, the second board conveyor being spaced from the first board conveyor; and
   wherein the first board conveyor is operable to continuously feed a first board resting thereon through the board receiving passage at a set speed and the second board conveyor is operable to continuously feed a second board resting thereon through the board receiving passage at substantially the same set speed such that the first board and the second board are simultaneously cut along their respective lengths by the band saw blade thereby at least doubling the board cutting capacity of the horizontal band saw device as compared to a band saw device including only one board conveyor operating at the set speed.

2. The horizontal band saw device, as set forth in claim 1, further comprising:
   a third board conveyor extending through the board receiving passage of the head and beneath the band saw blade, the third board conveyor being spaced from the second board conveyor; and
   wherein the third board conveyor is operable to continuously feed a third board resting thereon through the board receiving passage at substantially the same set speed such that the first board, the second board, and the third board are simultaneously cut along their respective lengths by the band saw blade thereby at least tripling the board cutting capacity of the horizontal band saw device as compared to a band saw device including only one board conveyor operating at the set speed.

3. The horizontal band saw device, as set forth in claim 2, further comprising:
   a fourth board conveyor extending through the board receiving passage of the head and beneath the band saw blade, the fourth board conveyor being spaced from the third board conveyor; and
   wherein the fourth board conveyor is operable to continuously feed a fourth board resting thereon through the board receiving passage at substantially the same set speed such that the first board, the second board, the third board, and the fourth board are simultaneously cut along their respective lengths by the band saw blade thereby at least quadrupling the board cutting capacity of the horizontal band saw device as compared to a band saw device including only one board conveyor operating at the set speed.

4. The horizontal band saw device, as set forth in claim 1, wherein movement of both the first board conveyor and the second board conveyor is effected by an adjustable speed motor operatively connected to each of the first board conveyor and the second board conveyor such that the set speed may be adjusted.

5. The horizontal band saw device, as set forth in claim 1, wherein the band saw blade moves from the first side of the board receiving passage to the second side of the board receiving passage, the first board conveyor positioned between the first side of the board receiving slot and the second board conveyor such that the band saw blade passes through the first board prior to passing through the second board, and wherein the band saw device further includes means positioned between the first board conveyor and the second board conveyor for collecting dust created as the band saw blade passes through the first board.

6. The horizontal band saw device, as set forth in claim 5, wherein the means for collecting dust includes a dust directing bin and a vacuum source, the dust directing bin including a blade slot formed therein for allowing the band saw blade to pass therethrough, the vacuum source positioned below the dust directing bin and including an opening for collecting dust directed thereto.

7. The horizontal band saw device, as set forth in claim 1, wherein the first board conveyor is formed by a first belt and the second board conveyor is formed by a second belt.

8. The horizontal band saw device, as set forth in claim 1, wherein the first board conveyor is formed by a first track and the second board conveyor is formed by a second track.

9. The horizontal band saw device, as set forth in claim 1, wherein the first board conveyor is formed by a first aligned series of rotatable rollers and the second board conveyor is formed by a second aligned series of rotatable rollers.

* * * * *